W. F. LUTZ.
BUTCHER'S KNIFE.
APPLICATION FILED SEPT. 7, 1915.
1,203,637.
Patented Nov. 7, 1916.
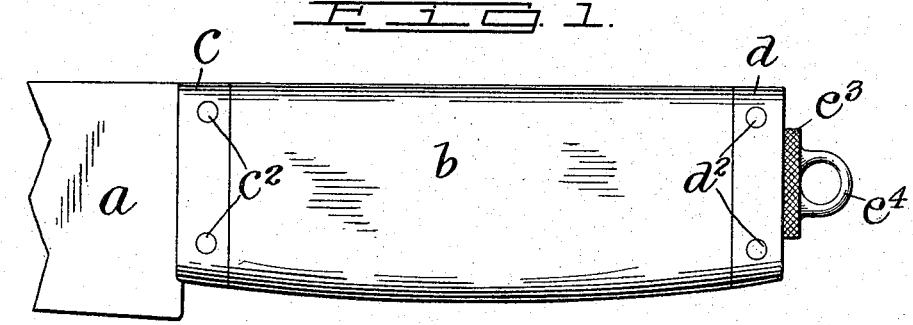
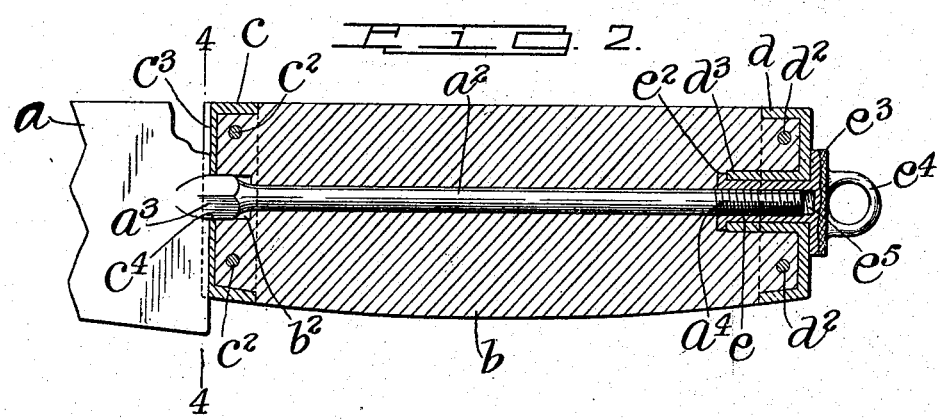
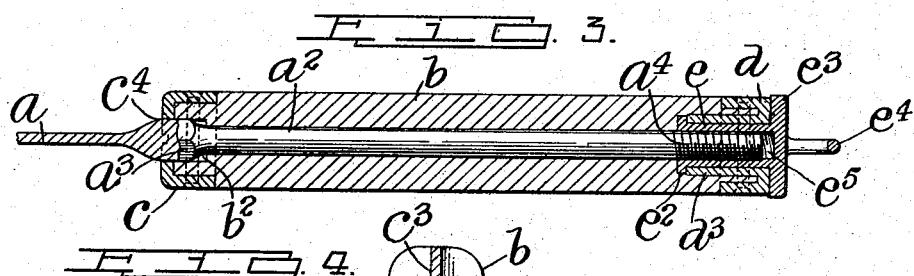
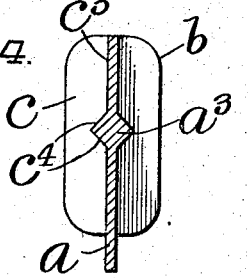
Witnesses:
H. E. Thompson
C. Mulreany
Inventor
William F. Lutz,
By his Attorneys
Edgar Tate & Co.

UNITED STATES PATENT OFFICE.

WILLIAM F. LUTZ, OF BROOKLYN, NEW YORK.

BUTCHER'S KNIFE.

1,203,637.  Specification of Letters Patent.  Patented Nov. 7, 1916.

Application filed September 7, 1915.  Serial No. 49,198.

*To all whom it may concern:*

Be it known that I, WILLIAM F. LUTZ, a citizen of the United States, and residing at Brooklyn, in the county of Kings and State of New York, have invented certain new and useful Improvements in Butchers' Knives, of which the following is a specification, such as will enable those skilled in the art to which it appertains to make and use the same.

This invention relates to butchers' knives, and particularly to the handles thereof, and the object of the invention is to provide a device of this class the blade of which is detachable in order to substitute a new blade or blades for old ones whenever desired, and the invention consists in the particular means hereinafter described whereby the above object is accomplished.

The invention is fully disclosed in the following specification, of which the accompanying drawing forms a part, in which the separate parts of my improvement are designated by suitable reference characters in each of the views, and in which:—

Figure 1 is a side view of a butcher's knife, the handle construction of which is made according to my invention; Fig. 2 a central longitudinal section through the handle in the plane of the blade; Fig. 3 a similar section at right angles to the plane of the blade; and, Fig. 4 a section on the line 4—4 of Fig. 2.

In the accompanying drawing, I have shown a butcher's knife, comprising a blade $a$ and a handle $b$ and, in the practice of my invention, the blade $a$ is provided with a shank $a^2$ which passes longitudinally through the handle and the end portion $a^3$ of the shank $a^2$ adjacent to the blades is enlarged and angular in form in cross section, while the other end portion $a^4$ of said shank is screw-threaded.

The blade end of the handle is provided with a cap $c$ which is secured to the handle by pins $c^2$ passed through the skirt portion of said cap and through said handle, and the other end portion of said handle is provided with a cap $d$ secured to the handle by pins $d^2$ passed transversely through the skirt portion thereof and through the handle. The cap $d$ is also provided with a central inwardly directed sleeve $d^3$ in which is a tubular bushing $e$ the inner end of which is flanged as shown at $e^2$, and the outer end of which is provided with an enlarged head $e$ which is preferably milled and which is provided with an eye member or handle member $e^4$ by which the bushing $e$ may be rotated in the sleeve $d^3$ of the cap $d$ but by reason of the flange $e^2$ the bushing $e$ while rotatable therein is not detachable from the sleeve $d^3$. The bushing $e$ is also provided with an interior thread $e^5$ which corresponds with the thread on the outer end of the shank $a^2$ of the blade. The blade end of the handle is also provided with a central socket $b^2$ to receive the enlarged end portion $a^3$ of the shank $a^2$, and said handle may be of any desired shape in cross section but, in the construction shown, it is oblong in cross section. The cap $c$ is also provided with a transverse groove $c^3$ to receive the corresponding end portion of the blade and the handle may be turned on the shank $a^2$ of the blade, or said shank $a^2$ may be turned in the handle. In the operation of detaching the blade, as hereinafter described, neither of these operations can be performed until the bushing sleeve $e$ has been turned so as to partially disconnect the blade from the handle.

In the construction shown, all the parts are in their operative position and the knife is ready for use, and whenever it is desired to detach the blade, the bushing sleeve $e$ is turned to the left and the shank $a^2$ is forced outwardly so as to release the blade from the groove $c^3$ in the cap $c$, and the enlarged head portion $a^3$ of the shank from said cap, after which either the blade or the bushing sleeve $e$ may be turned so as to fully disconnect the shank $a^2$ from said bushing, after which the handle and the shank $a^2$ may be completely detached by drawing the blade outwardly as will be readily understood, and the blade, or another blade, may be connected with the handle, as shown in Figs. 2 and 3, or by passing the shank $a^2$ inwardly through the handle until the enlarged head portion $a^3$ thereof enters the cap $c$ and the socket $b^2$ in the end of the handle, and in this operation the bushing sleeve must be turned to the right and the continual turning of said sleeve will draw the shank of the blade completely into the handle and lock it there as shown in Figs. 2 and 3.

The aperture $c^4$ in the cap $c$ is of the same form in cross section as the head portion $a^3$ of the shank $a^2$ and when the blade has been fully connected with the handle, as shown, said blade will be immovable and can only be detached by manipulating the sleeve bushing $e$, as hereinbefore described.

Having fully described my invention, what I claim as new and desire to secure by Letters Patent, is:—

1. A knife of the class specified, comprising a handle and detachable blade, said handle being provided at each end with a cap, the cap at the outer end of the handle being provided with a rotatable bushing having an internal thread and the cap at the blade end of the handle being provided with a central aperture which is angular in form and which communicates with a corresponding recess in the said end of the handle, and the blade being provided with a shank which passes through said aperture and through the handle, the free end of which is threaded to correspond with the thread of said bushing, said shank being provided adjacent to the blade with a head which is angular in cross section, and adapted to fit in said aperture and the cap at the blade end of the handle being also provided with a central transverse recess to receive the corresponding end of the blade.

2. A knife of the class described, comprising a handle and a detachable blade, said handle being provided at each end with a cap, the cap at the outer end of the handle being provided with an inwardly directed sleeve in which is a rotatable and non-detachable bushing having an internal thread, said bushing being provided with a finger piece, said blade being provided with a shank which passes through the handle and into said bushing and is threaded to correspond with the thread in said bushing and the cap at the blade end of the handle and the shank of the blade being provided with means to prevent the rotation of said blade whereby said blade may be drawn into position by the rotation of said bushing.

In testimony that I claim the foregoing as my invention I have signed my name in presence of the subscribing witnesses this 4th day of September, 1915.

WILLIAM F. LUTZ.

Witnesses:
C. MULREANY,
H. E. THOMPSON.

Copies of this patent may be obtained for five cents each, by addressing the "Commissioner of Patents, Washington, D. C."